(12) United States Patent
Xu

(10) Patent No.: US 7,524,048 B2
(45) Date of Patent: Apr. 28, 2009

(54) MELTABLE REACTIVE INK AND PROCESS OF USING SAME

(75) Inventor: Ming Xu, Mount Pleasant, SC (US)

(73) Assignee: Sawgrass Technologies, Inc., Mt. Pleasant, SC (US)

( * ) Notice: Subject to any disclaimer, the term of this patent is extended or adjusted under 35 U.S.C. 154(b) by 527 days.

(21) Appl. No.: 11/342,105

(22) Filed: Jan. 27, 2006

(65) Prior Publication Data

US 2006/0124015 A1 Jun. 15, 2006

Related U.S. Application Data

(60) Continuation-in-part of application No. 10/638,810, filed on Aug. 11, 2003, now Pat. No. 7,041,424, which is a continuation-in-part of application No. 09/978, 190, filed on Oct. 15, 2001, now Pat. No. 6,673,503, said application No. 10/638,810 is a continuation-in-part of application No. 09/978,388, filed on Oct. 18, 2001, now Pat. No. 6,649,317, which is a continuation-in-part of application No. 09/978,190, filed on Oct. 15, 2001, now Pat. No. 6,673,503, which is a continuation-in-part of application No. 09/556,176, filed on Apr. 20, 2000, now Pat. No. 6,341,856, and a continuation-in-part of application No. 09/156,871, filed on Sep. 18, 1998, now Pat. No. 6,402,313, which is a division of application No. 09/073,963, filed on May 6, 1998, now abandoned, which is a division of application No. 08/309,933, filed on Nov. 7, 1994, now Pat. No. 5,522, 317, application No. 11/342,105, which is a continuation-in-part of application No. 09/322,737, filed on May 28, 1999, now Pat. No. 6,348,939, said application No. 10/638,810 is a continuation-in-part of application No. 10/085,359, filed on Feb. 28, 2002, now Pat. No. 6,887,640.

(60) Provisional application No. 60/275,228, filed on Mar. 12, 2001, provisional application No. 60/648,194, filed on Jan. 28, 2005.

(51) Int. Cl.
  *B41J 2/175* (2006.01)
  *B41J 2/01* (2006.01)
  *G01D 11/00* (2006.01)

(52) U.S. Cl. .............................. 347/88; 347/99; 347/103

(58) Field of Classification Search .................. 347/88, 347/99, 84, 85, 95, 102, 100, 96, 103, 21
See application file for complete search history.

(56) References Cited

U.S. PATENT DOCUMENTS

| 5,389,958 | A | * | 2/1995 | Bui et al. ..................... 347/103 |
| 5,471,233 | A | * | 11/1995 | Okamoto et al. ............. 347/103 |
| 5,488,907 | A | * | 2/1996 | Xu et al. ...................... 101/488 |
| 5,640,180 | A | * | 6/1997 | Hale et al. ....................... 347/3 |
| 5,645,888 | A | * | 7/1997 | Titterington et al. ......... 427/256 |
| 6,103,041 | A | * | 8/2000 | Wagner et al. ............... 156/230 |
| 6,105,502 | A | * | 8/2000 | Wagner et al. ............... 101/491 |
| 6,341,856 | B1 | * | 1/2002 | Thompson et al. ........... 347/100 |
| 6,402,313 | B1 | * | 6/2002 | Xu et al. ........................ 347/96 |
| 6,966,643 | B2 | * | 11/2005 | Hale et al. ...................... 347/88 |

* cited by examiner

*Primary Examiner*—Stephen D Meier
*Assistant Examiner*—Leonard S Liang
(74) *Attorney, Agent, or Firm*—B. Craig Killough

(57) ABSTRACT

A process for printing images and subsequently bonding the image to a substrate by activating bonding through the application of energy. An ink may comprise reactive functional groups that are blocked to prevent reaction of reactive components during printing of the image by the digital imaging device. The ink is solid at ambient temperature, and may be liquefied after the ink is installed in the digital imaging device. Heat used to achieve phase change of the ink does not disable, by removal or otherwise, the blocking agent. After the image is printed by the imaging device, the reactive components are activated by an energy source, which may be heat, to promote chemical cross-linking and bonding of the image permanently onto a substrate. The substrate may be an intermediate substrate that provides a transfer sheet for subsequent transfer of the image to a final substrate. The formed image, including the colorant, is bonded to the substrate by the reactive components.

19 Claims, No Drawings

MELTABLE REACTIVE INK AND PROCESS OF USING SAME

Applicant claims the benefit of Provisional Patent Application No. 60/648,194 filed Jan. 28, 2005.

This application is a continuation in part of application Ser. No. 10/638,810 filed Aug. 11, 2003 now U.S. Pat. No. 7,041,424 which is a continuation-in-part of application Ser. No. 09/978,190, filed Oct. 15, 2001, now U.S. Pat. No. 6,673,503 which claims priority on provisional application Ser. No. 60/275,228, filed Mar. 12, 2001.

This application is a continuation in part of application Ser. No. 10/638,810 filed Aug. 11, 2003 which is a continuation-in-part of application Ser. No. 09/978,388, filed Oct. 18, 2001 now U.S. Pat. No. 6,649,317 which is a continuation-in-part of application Ser. No. 09/978,190, filed Oct. 15, 2001, now U.S. Pat. No. 6,673,503 which is a continuation-in-part of application Ser. No. 09/556,176, filed Apr. 20, 2000, now U.S. Pat. No. 6,341,856, and is a continuation-in-part of application Ser. No. 09/156,871, filed Sep. 18, 1998, now U.S. Pat. No. 6,402,313, which is a divisional of application Ser. No. 09/073,963, filed May 6, 1998, now abandoned which is a divisional of Ser. No. 08/309,933, filed Nov. 7, 1994,now U.S. Pat. No. 5,522,317 and a continuation-in-part of application Ser. No. 09/322,737, filed May 28, 1999, now U.S. Pat. No. 6,348,939.

This application is a continuation in part of application Ser. No. 10/638,810 filed Aug. 11, 2003, which is a continuation in part of application Ser. No. 10/085,359, filed Feb. 28, 2002 now U.S. Pat. No. 6,887,640.

FIELD OF THE INVENTION

This invention relates to printing inks and imaging processes.

SUMMARY OF THE INVENTION

A process for printing images, and subsequently bonding the image to a substrate by activating bonding through the application of energy. An ink may comprise reactive functional groups that are blocked to prevent reaction of reactive components during printing of the image by the digital imaging device. The ink is solid at ambient temperature, and may be liquefied after the ink is installed in the digital imaging device. Heat used to achieve phase change of the ink does not disable, by removal or otherwise, the blocking agent. After the image is printed by the imaging device, the reactive components are activated by an energy source, which may be heat, to promote chemical cross-linking and bonding of the image permanently onto a substrate. The substrate may be an intermediate substrate that provides a transfer sheet for subsequent transfer of the image to a final substrate. The formed image, including the colorant, is bonded to the substrate by the reactive components.

DESCRIPTION OF PREFERRED EMBODIMENTS

Inks according to the preferred embodiments are solid during storage and at ambient temperature. The ink is usually solid when installed into the imaging device but prior to printing. During, and generally just prior to the image generating process, such as ink jet printing, the ink is melted by the printer or other imaging device. The ink is liquefied in an ink reservoir by heating to the temperature required for phase change from solid to liquid by melting the ink. Ink droplets from the liquefied ink are printed to form an image. The droplets solidify onto a substrate to create one or more images. The solid inks according to the invention may comprise one or more inert hydrocarbon resins, polymers, waxes or other hydrophobic materials, and colorants that can be held within the ink reservoir at elevated temperature, without experiencing degradation from chemical reaction or material vaporization.

The ink may comprise functional groups capable of reacting with active hydrogen such as isocyanate, epoxy, epoxy acrylate, melamine-formaldehyde resin, urea-formaldehyde resin, anhydride compound, imino, polyamine, polycarboxylic acid, guanamine resin, benzoguanamine resin, and equivalents, through various chemical reactions, such as addition, condensation, and substitution during polymerization/cross-linking. These functional groups react with active hydrogen to create cross-linking and bonding with components, compounds or materials that comprise active hydrogen groups such as polyol, acrylic polyol, urethane/polyurethane polyol, polyester polyol, amine/polyamine, amide/polyamide, cellulose, silk, cotton, and various kinds of natural and synthetic homopolymeric, copolymeric, terpolymeric materials having active hydrogen groups. In order to prevent premature or undesired chemical reaction, the active functional groups, blocking of the reaction is achieved using one or more blocking agents, or by incorporating blocking functions within the reagents, or by the presence of a physical barrier, such as an encapsulating material or shell. These protecting agents or barriers may then be disabled or removed chemically or physically. In the preferred embodiment, the protecting agents or barriers are removed by the application of heat, radiation, or other forms energy imparted to the protecting agents or barriers. Other chemical and/or mechanical means may be used for disabling or removing the blocking agent or protecting agent.

The ink may comprise one or more components that are solid at ambient temperature, but which melt and liquefy in the printer or other imaging device, either prior to, or during, the imaging process. A melted, liquid ink enables an inkjet imaging device, such as a device comprising a piezoelectric printhead, to produce ink droplets reliably and consistently during the imaging or printing process. The solid ink, under operating temperature, typically has a melting temperature that is lower than the printing temperature. Viscosity after liquefaction is designed as required by the printhead of the printer.

The present invention can be used for either monochrome imaging or multiple color imaging. One or more colorants, such as dye, pigment, polymeric colorant, inorganic coloring material, metallic colorant, reflective colorant, fluorescent, phosphorescent, infrared radiation colorant, thermochromatic colorant, or other colorant may be used. An invisible colorant that is made visible upon exposure to radiation, or other energy or chemicals, may be used.

Ink without colorant may also be used. A colorant-free ink supplies additional components or materials to enhance image processing, image quality and/or durability.

When used, the colorants may or may not have affinity to the printing media and/or final imaging substrate. Disperse dyes, acid dyes, basic dyes, solvent dyes, sublimation dyes, metallic dyes, reactive dyes and reactive disperse dyes may be used as single colorant, or in combination with other dyes or colorants to generate desired color gamut, color intensity, vividness, colorfastness and other special effects.

The method may be used in direct printing or transfer printing applications. In direct printing processes, ink droplets produced by the imaging device are directed onto the final substrate. The blocking agent is not disabled or removed during the formation of the image on the substrate. A subsequent activation process removes or disables the blocking function and creates a chemical bonding or cross-linking to the substrate.

One embodiment of the invention uses transfer printing. As the term is used herein, "transfer printing" means a transfer of an image from a first substrate to a second substrate. In transfer printing, the ink droplets are first introduced onto an intermediate substrate for form an image. The image printed with the ink is transferred onto a subsequent, and usually final, substrate, which may be paper, film, fabric/textile, polymeric material or coating or other substrate upon which the image permanently appears. The blocking function is not removed or disabled prior to image formation of the image on the intermediate substrate. No reaction of the reactive components or reagents occurs, and the image is not bonded to the intermediate substrate by reaction of the components. The ink is subsequently "activated" by the application of energy to the printed image, which may be the application of heat at a temperature higher than the ink phase change temperature provided by the printer. This activation removes or disables the blocking function, allowing reaction and causing a chemical bonding or cross-linking, to create a permanent image onto the final substrate. In one embodiment, the final substrate may be positioned against the image, and heat applied, such as by a heat press, at a temperature that is high enough to disable or remove the blocking agent. The ink may be activated after transfer to the final substrate in another embodiment.

A final substrate comprising materials having active hydrogen functional groups that participate in cross-linking and chemical bonding may be used. Examples of such substrates including cotton, jute, silk, rayon, wool, polyamides such as Nylon 6, Nylon 66 or Nylon 12, and polyamide-imide, polysaccharide, polyvinyl alcohol, and equivalents. Surface modified materials through chemical etching, chemical grafting, or coating to increase the quantity of active hydrogen functional groups may also be used.

Inert or non-reactive components such as wax, fatty acid ester, hydrocarbon resin, thermal plastic resin, polymer material and the like may be used to improve ink physical performance, including fluid properties, printability or jetting ability, viscosity, visco-elasticity, melt/solidify speed, and the like, and color performance such as color intensity, and colorfastness. An example is polyester resin that enhances color intensity and image vividness when sublimation or disperse dyes and/or polar pigments are used as ink colorant.

Chemical blocking may prevent, or materially decrease, premature or undesired chemical reaction, bonding or cross-linking of reactive components where hydrogen is present in the ink or in the substrate. A blocked isocyanate or polyisocyanate, for example, can be derived from a reaction of an isocyanate/polyisocyanate and a blocking agent. The blocked isocyanate or polyisocyanate reforms the original isocyanate, removing or disabling the blocking agent(s) by heating, or by heating with other nucleophilic reagents, to a temperature that permits reaction. Examples of blocking agents for isocyanates and polyisocyanates include phenols and substituted phenols, alcohols and substituted alcohols, thiols, lactams such as alpha-pyrrolidone, epsilon-caprolactam, mercaptans, primary and secondary acid amides, imides, aromatic and aliphatic amines, active methylene compounds, oximes of aldehydes and ketones and salts of sulfurous acid. Silane blocking agents such as silyl/alkylsilyl groups, through a reversible coupling reaction, may by used for carboxylic acids/polycarboxylic acids, polyamine to prevent premature reaction.

Blocking agents and/or protective groups that can be removed or disabled by the application of energy, and can be applied to materials with reactive functional groups that are capable of reacting with active hydrogen, may be used. For example, alkylated urea-formaldehyde resin and alkylated melamine-formaldehyde resin may be useful, for example, to prevent undesired reactions, such as polymerization and hydrolysis. Alkyl ester may be used to protect carboxyl functional groups and block premature reaction of such functional groups. Both external and internal blocking protecting techniques may be used to block reactive components from undesired chemical reaction. Internal blocking, rather than a separate blocking agent may be used, such as where the use of separate blocking materials or chemicals is difficult to remove or disable, or is hazardous in nature. Blocking or protecting may be removed or disabled by either a ring-open mechanism, hydrogen-bond removal or the like, to initiate the desired chemical bonding reaction with active hydrogen functional groups. If the blocking function is "removed", its ability to materially inhibit reaction is disabled; it is not necessary that the blocking agent is physically removed or that the blocking function is entirely removed.

Encapsulation may be used to physically block or protect reactive components of the ink to prevent undesired or premature reaction. Inert materials such as waxes, esters, non-reactive polymeric resin materials such as acrylic, polyvinyl chloride, non-reactive or saturated polyester, polyethylene, polystyrene, polystyrene-butadiene, or and the like may be used as a shell to encapsulate one or more reactive ingredients inside the shell, for example, in a core-shell method. The reactive ingredients are isolated from contacting other ink ingredients or substrate. The shell is removed at the desired time, and after the image is formed on the substrate.

The ink may comprise active hydrogen functional groups in combination with reactive components. Suitable materials include polyols, polyamines and polythiols. Polyols suitable for use in the present invention may comprise polyether, polyester, or polythioether. Polyamide, cellulose, sucrose, and polysacchride, and other natural and synthetic polymeric materials containing active hydrogen functional groups may be used. Molecular weight, glass transition temperature, melting behavior, melting viscosity and/or hydrogen bond strength are used as guidelines in choosing components having active hydrogen functional groups, since the components must be capable of melting and liquefication for printing.

A homogenous ink may be used, i.e., all ingredients of the ink are melted and liquefied at the printing temperature, without the presence of substantial particles or aggregates. A non-homogenous type of ink may be used wherein certain particles or aggregates are in the molten phase of ink, as long as the particle size distribution (PSD) does not negatively impact printing performance. A sol-gel type of ink may also be used where ultra-fine or spherical shaped solid particles are suspended in the melted and liquefied ink that is processed from a solid gel phase. These particles or aggregates may be colorants such as pigments, metallic powders, organometallic material powders, sublimation dye, disperse dye particles, resins, encapsulated reactive components, additives, or, in some cases, inert ingredients that enhance the quality of the image on the final substrates.

Both hydrophobic and hydrophilic inks may be used. Depending upon the intermediate and final substrate, either one or both may be used to achieve desired image quality and colorfastness. For example, in a multiple color printing configuration, one of the inks may be hydrophobic, while the remaining inks are hydrophilic. An ink mixture of the two types may be used, wherein either an oil-in-water or water-in-oil type of emulsion, microemulsion/macroemulsion or colloidal type of system is achieved, depending upon the ratio of the ingredients.

Additives may be used in the ink. Additives examples include viscosity control agents, surface tension and/or interfacial tension control agents, dispersing agents, wetting agents, emulsifying agents, anti-oxidant and stabilizing agents, lightfastness enhancing materials and/or Hinded Amine Light Stablizers (HALs), free-radical scavenger materials, oxygen scavenger, moisture scavenger, anti-settling agents, anti-kogation agents, and anti-curling agents. Catalysts may also be used to help control reaction of cross-linking or bonding of the image to the final substrate. A preferred embodiment uses blocked catalysts that catalyze a chemical reaction of cross-linking and bonding only if a desired condition is reached. Examples of such blocked catalysts include Nacure® 2547, Nacure® 4575, and Nacure® 4167. The use of a catalyst is particularly desirable when the final activation conditions are harsh, and the final substrate is sensitive to such harsh conditions.

The present invention may be used in phase change inkjet printing, hot-melt imaging device including wax thermal transfer printing, or hot-melt digital coating or spraying, diffusion thermal transfer printing, either alone or in combination with other analog or digital printing mechanisms, and through single or multiple printing engines.

What is claimed is:

1. A method of digital printing, comprising the steps of:
   a. preparing an ink that is solid at ambient temperature, said ink comprising a compound comprising a functional group which reacts with active hydrogen, a compound comprising a functional group comprising active hydrogen, and a blocking agent, wherein said blocking agent, during storage and printing of said ink, materially inhibits a reaction between said compound comprising a functional group which reacts with active hydrogen and said compound comprising a functional group comprising active hydrogen;
   b. supplying a digital printer which uses solid ink with said ink;
   c. applying heat to said ink to melt said ink, wherein said ink melts at a temperature that does not materially disable said blocking agent from materially inhibiting a reaction between said compound comprising a functional group which reacts with active hydrogen and said compound comprising a functional group comprising active hydrogen;
   d. melting said ink and printing said ink onto a substrate to form an image on said substrate; and
   e. subsequently disabling said blocking agent and reacting said compound comprising a functional group which reacts with active hydrogen with said compound comprising a functional group comprising active hydrogen to bond said image to said substrate.

2. A method of digital printing as described in claim 1, wherein, after said ink is printed, said blocking agent is disabled from materially inhibiting a reaction between said compound comprising a functional group which reacts with active hydrogen and said compound comprising a functional group containing active hydrogen by the application of sufficient heat to said image to disable said blocking agent.

3. A method of digital printing as described in claim 1, wherein said ink comprises a catalyst that facilitates a reaction between said compound comprising a functional group which reacts with active hydrogen and said compound comprising a functional group containing active hydrogen, and wherein said blocking agent acts upon said catalyst to block said catalyst from facilitating said reaction.

4. A method of digital printing, comprising the steps of:
   a. preparing an ink that is solid at ambient temperature, said ink comprising a colorant, a first reagent, a second reagent that reacts with said first reagent, and a blocking agent which, during storage and printing of said ink, prevents a reaction between said first reagent and said second reagent;
   b. supplying a digital printer which uses solid ink with said ink;
   c. applying heat to said ink to melt said ink, wherein said ink melts at a temperature that does not materially disable said blocking agent from materially inhibiting a reaction between said first reagent and said second reagent;
   d. melting said ink and printing said ink onto a substrate to form an image on said substrate; and
   e. subsequently disabling said blocking agent and reacting said first reagent and said second reagent to bond said image to said substrate.

5. A method of digital printing as described in claim 4, wherein, after said ink is printed, said blocking agent is disabled from materially inhibiting a reaction between said first reagent and said second reagent by applying sufficient heat to said image to disable said blocking agent.

6. A method of digital printing as described in claim 4, wherein said ink comprises a catalyst that facilitates a reaction between said first reagent and said second reagent, and wherein said blocking agent acts upon said catalyst to block said catalyst from facilitating said reaction.

7. A method of digital printing, comprising the steps of:
   a. preparing an ink that is solid at ambient temperature, said ink comprising a first reagent, a second reagent that reacts with said first reagent, a catalyst that facilitates a reaction between said first reagent and said second reagent, wherein said catalyst comprises a blocking agent, and wherein said blocking agent materially inhibits said catalyst from facilitating a reaction between said first reagent and said second reagent;
   b. supplying a digital printer which uses solid ink with said ink;
   c. applying heat to said ink to melt said ink, wherein said ink melts at a temperature that does not materially disable said blocking agent from materially inhibiting a reaction between said first reagent and said second reagent;
   d. melting said ink and printing said ink onto a substrate to form an image on said substrate; and
   e. subsequently disabling said blocking agent and reacting said first reagent and said second reagent to bond said image to said substrate.

8. A method of digital printing as described in claim 7, wherein, after said ink is printed, said blocking agent is disabled from materially inhibiting a reaction between said first reagent and said second reagent by applying sufficient heat to said image to disable said blocking agent.

9. A method of digital printing, comprising the steps of:
   a. preparing an ink that is solid at ambient temperature, said ink comprising a compound comprising a functional group which reacts with active hydrogen, a compound comprising a functional group comprising active hydrogen, and a blocking agent, wherein said blocking agent, during storage and printing of said ink, materially inhibits a reaction between said compound comprising a functional group which reacts with active hydrogen and said compound comprising a functional group comprising active hydrogen;

b. supplying a digital printer which uses solid ink with said ink;

c. applying heat to said ink to melt said ink, wherein said ink melts at a temperature that does not materially disable said blocking agent from materially inhibiting a reaction between said compound comprising a functional group which reacts with active hydrogen and said compound comprising a functional group comprising active hydrogen;

d. melting said ink and printing said ink onto an intermediate substrate to form an image on said intermediate substrate;

e. transferring said image from said intermediate substrate onto a subsequent substrate; and f. then disabling said blocking agent and reacting said compound comprising a functional group which reacts with active hydrogen with said compound comprising a functional group comprising active hydrogen to bond said image to said subsequent substrate.

10. The method of digital printing as described in claim 9, wherein, after said ink is printed onto said intermediate substrate, said blocking agent is disabled from materially inhibiting a reaction between said compound comprising a functional group which reacts with active hydrogen and said compound comprising a functional group containing active hydrogen by the application of sufficient heat to said image to disable said blocking agent and thereby transfer said image to said subsequent substrate.

11. The method of digital printing as described in claim 9, wherein said ink comprises a catalyst that facilitates a reaction between said compound comprising a functional group which reacts with active hydrogen and said compound comprising a functional group containing active hydrogen, and wherein said blocking agent acts upon said catalyst to block said catalyst from facilitating said reaction.

12. The method of digital printing as described in claim 9, wherein said subsequent substrate is a member of the group consisting of paper, film, fabric/textile and polymeric materials.

13. A method of digital printing, comprising the steps of:

a. preparing an ink that is solid at ambient temperature, said ink comprising a colorant, a first reagent, a second reagent that reacts with said first reagent, and a blocking agent which, during storage and printing of said ink, prevents a reaction between said first reagent and said second reagent;

b. supplying a digital printer which uses solid ink with said ink;

c. applying heat to said ink to melt said ink, wherein said ink melts at a temperature that does not materially disable said blocking agent from materially inhibiting a reaction between said first reagent and said second reagent;

d. melting said ink and printing said ink onto an intermediate substrate to form an image on said intermediate substrate;

e. transferring said image from said intermediate substrate onto a subsequent substrate; and f. then disabling said blocking agent and reacting said first reagent and said second reagent to bond said image to said subsequent substrate.

14. The method of digital printing as described in claim 13, wherein, after said ink is printed onto said intermediate substrate, said blocking agent is disabled from materially inhibiting a reaction between said first reagent and said second reagent by applying sufficient heat to said image printed on said intermediate substrate to disable said blocking agent.

15. The method of digital printing as described in claim 13, wherein said ink comprises a catalyst that facilitates a reaction between first reagent and said second reagent, and wherein said blocking agent acts upon said catalyst to block said catalyst from facilitating said reaction.

16. The method of digital printing as described in claim 13, wherein said subsequent substrate is a member of the group consisting of paper, film, fabric/textile and polymeric materials.

17. A method of digital printing, comprising the steps of:

a. preparing an ink that is solid at ambient temperature, said ink comprising a first reagent, a second reagent that reacts with said first reagent, a catalyst that facilitates a reaction between said first reagent and said second reagent, wherein said catalyst comprises a blocking agent, and wherein said blocking agent materially inhibits said catalyst from facilitating a reaction between said first reagent and said second reagent;

b. supplying a digital printer which uses solid ink with said ink;

c. applying heat to said ink to melt said ink, wherein said ink melts at a temperature that does not materially disable said blocking agent from materially inhibiting a reaction between said first reagent and said second reagent;

d. melting said ink and printing said ink onto an intermediate substrate to form an image on said intermediate substrate;

e. transferring said image from said intermediate substrate onto a subsequent substrate; and f. then disabling said blocking agent and reacting said first reagent and said second reagent to bond said image to said subsequent substrate.

18. The method of digital printing as described in claim 17, wherein, after said ink is printed onto said intermediate substrate, said blocking agent is disabled from materially inhibiting a reaction between said first reagent and said second reagent by applying sufficient heat to said image printed on said intermediate substrate to disable said blocking agent.

19. The method of digital printing as described in claim 17, wherein said subsequent substrate is a member of the group consisting of paper, film, fabric/textile and polymeric materials.

* * * * *